United States Patent [19]

Podvin et al.

[11] Patent Number: 4,641,930
[45] Date of Patent: Feb. 10, 1987

[54] APPARATUS FOR POSITIONING FLAT OBJECTS FOR MICROSCOPIC EXAMINATION

[75] Inventors: T. Charles Podvin, Poway; Gene A. Porter, Escondido, both of Calif.

[73] Assignee: Micromanipulator Microscope Co., Inc., Escondido, Calif.

[21] Appl. No.: 561,643

[22] Filed: Dec. 15, 1983

[51] Int. Cl.[4] ............................................. G02B 21/26
[52] U.S. Cl. .................................................... 350/529
[58] Field of Search ...................... 350/529, 530, 531; 355/74

[56] References Cited

U.S. PATENT DOCUMENTS 4,012,112 3/1977 Masterson ........................... 350/531
4,189,953 2/1980 Volk ...................................... 74/479

FOREIGN PATENT DOCUMENTS 597077  4/1960 Canada .................................. 355/74
0021752 2/1979 Japan ................................... 350/529
2100881 1/1983 United Kingdom ................. 355/74

OTHER PUBLICATIONS

Semprex Corp. product literature "D-102 Microscope Stand".

Primary Examiner—John K. Corbin
Assistant Examiner—Vincent J. Lemmo
Attorney, Agent, or Firm—Fitch, Even, Tabin & Flannery

[57] ABSTRACT

Apparatus is provided for guiding a pellicle-covered photomask or other flat object into viewing position for inspection upon a flat top plate of a stage below the objective of a microscope. The apparatus includes a pair of spaced parallel rails having inwardly extending upper and lower flanges that define opposed keyways in which keybars at the edges of a photomask-carrying paddle slide. To protect the pellicle membrane and to space the latter above the top stage top plate, at entrance ends of the rails, segments of the upper flanges are recessed greater than the width of the paddle to permit a vertical dropping movement of the leading end of paddle onto inlet horizontal guide surfaces. These guide surfaces are broad platforms on which may be deposited the leading end of the paddle. The recessed segments are spaced apart by a distance greater than the width of the paddle and as the leading end of the paddle is pushed forwardly, it engages inwardly inclined cam surfaces which cam the paddle to a centered position between the guide rails.

10 Claims, 8 Drawing Figures

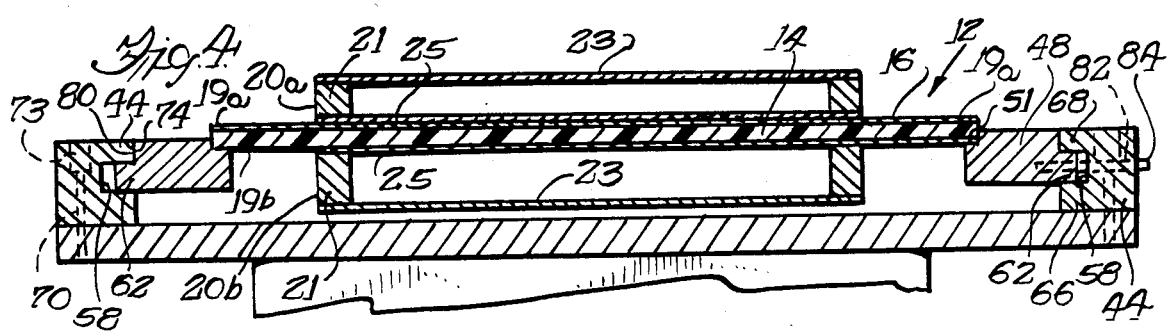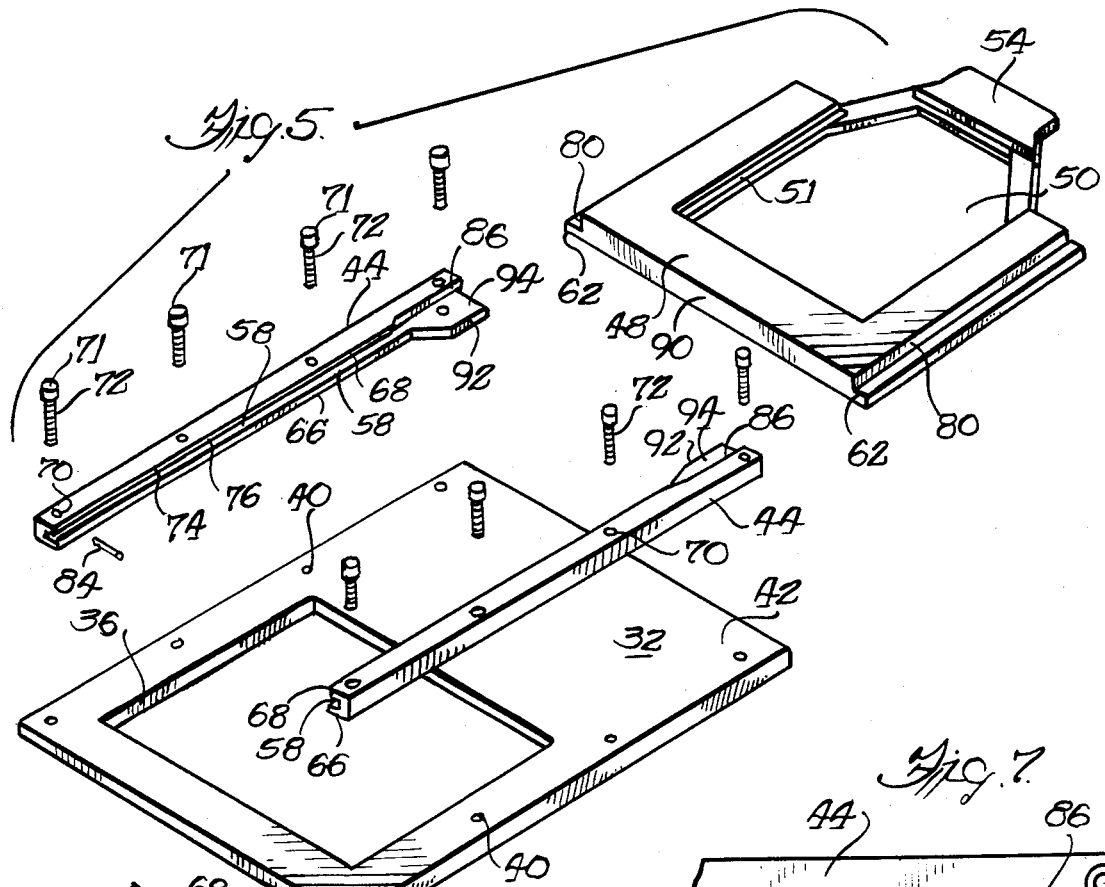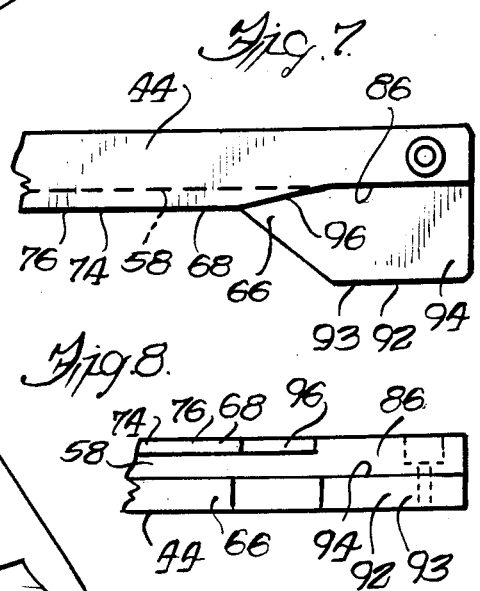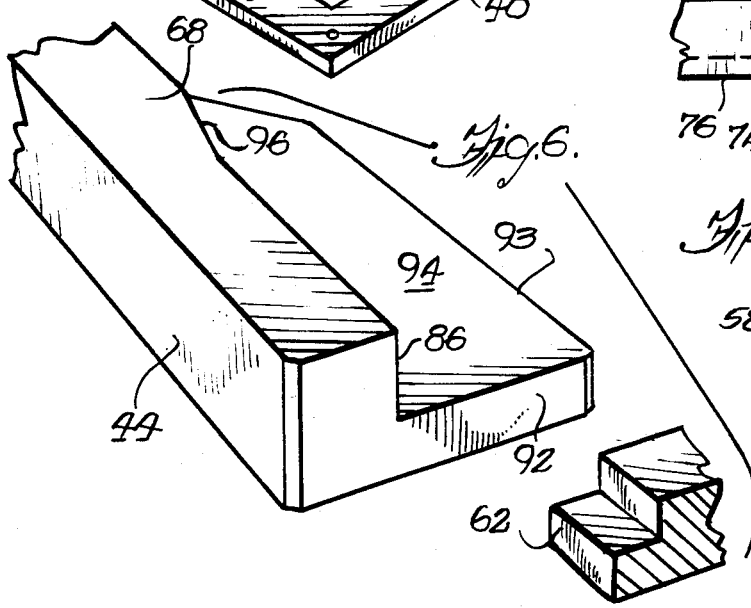

APPARATUS FOR POSITIONING FLAT OBJECTS FOR MICROSCOPIC EXAMINATION

The present invention relates to microscopic inspection of flat objects and more particularly to an improved means for positioning flat delicate objects in front of the objective of the microscope.

The present invention is an improvement on apparatus which is used for positioning flat, delicate objects in front of the objective of a microscope and in particular to apparatus for inspecting photomasks by which integrated circuits are formed by a microlithography technique.

The microlithography technique is similar to photography except that glass coated with etched chrome, called a photomask, serves as the negative from which the integrated circuit is printed. The negative or photomask is formed from a photomask blank comprising a glass plate covered on one surface with a layer of chromium, which is, in turn, covered with a photo-resist layer. The resist of the blank is exposed to a focused geometric light pattern, creating a photochemical change in the exposed area. The exposed blank is then subjected to a developing solution that removes exposed resist, and the blank is then exposed to an acid solution which removes the underlying chromium in the regions where the resist has been removed, thereby etching the geometric pattern into the chromium. Relatively recently, it has become common practice to protect the developed photomask from dust by packaging the photomask as a unit with at least its etched surface and frequently both surfaces protected by a "pellicle" consisting of a frame carrying a membrane of transparent material, such as nitrocellulose or a PEHB membrane, stretched across the frame to overlie the etched surface spaced therefrom by about 3-6 mm.

The pellicle-protected photomask is then used for projecting the geometric pattern onto a silicon wafer that is coated with a thin layer or membrane of photoresist. By a multi-step process, the exposure pattern is developed into an integrated circuit of the precise projected geometric pattern.

The developed photomask contains much minute detail, and functioning of the integrated circuit requires precise transfer of the geometric pattern to the developed photomask. Photomasks are therefore inspected under a microscope several times, both before and after development. When the photomask is inspected prior to exposure, light of wavelengths to which the resist is insensitive is used.

As a means of aligning the photomask below the objective of a microscope, it is known to provide a movable stage on which the photomask is positioned. The stage has adjustment means for moving the stage in both the X and Y axes, i.e., side-to-side and forward and rearward. As a means for placing the photomask on the stage without damaging the photomask, a system has been developed in which a top plate of the stage carries parallel rails or guides at its front and back edge, and edge portions of a paddle that carry the photomask are slid along the rails, aligning the photomask below the microscope objective. While this system has been proven to be quite useful, the recent use of pellicles to protect photomasks requires modification of the system. The stretched membranes of the pellicles are very delicate, and any accidental trauma will probably destroy the membrane. Trauma to the pellicle may occur, for example, if the paddle is inserted into the rails at an incorrect angle so that the pellicle bumps an edge of the stage. A technician could also damage the pellicle if he encounters difficulty in aligning the paddle in the rails and accidentally bumps the photomask-carrying paddle into a surface of the inspection station.

Accordingly it is a primary objective of the invention to provide an improved photomask inspection assembly particularly adapted for alignment of a pellicle-covered photomask below the objective of a microscope that helps assure that the pellicle membrane will not be damaged.

It is another object of the invention to provide an assembly that facilitates insertion and alignment of the photomask below the objective of the microscope.

A photomask inspection station includes a microscope and an adjustable stage for moving the photomask side-to-side and forward and rearward below the objective of the microscope. The stage has a flat, horizontal top plate of which a certain portion is positionable for viewing under the objective of the microscope and over which the photomask is positioned. The photomask is carried on a paddle, and parallel guide rails are mounted on the top plate for aligning the paddle over the viewable portion of the top plate. The guide rails have horizontal slots or keyways opening inward in which edge portions or keybars of a photomask-carrying paddle are slidably received. Insertion of a photomask-carrying paddle into the rail tracks at the entry end of the guide rails is facilitated by an inlet means. Preferably, the latter comprises a portion of each of the overhanging flanges, which define the upper sides of the keyways, being recessed outward or apart greater than the width of the paddle. This allows the paddle to be lowered into the entrance of the rails. Also at the entry end of the rails, a segment of each of the lower flanges, which define the lower sides of the keyways, is expanded inward, providing a broad platform for receiving the paddle thereon. Adjacent the entry ends of the rails are inwardly inclined surfaces which cam the paddle from the broader entry region to a more constricted region between lateral bearing surfaces of the guide rails.

These and other objects and advantages of the invention will now be described in greater detail with reference to the drawing in which FIG. 1 is a perspective view of a photomask inspection station including a microscope, a movable stage disposed below the objective of the microscope and a photomask positioned by a paddle over the upper surface of the top plate;

Figure 2:
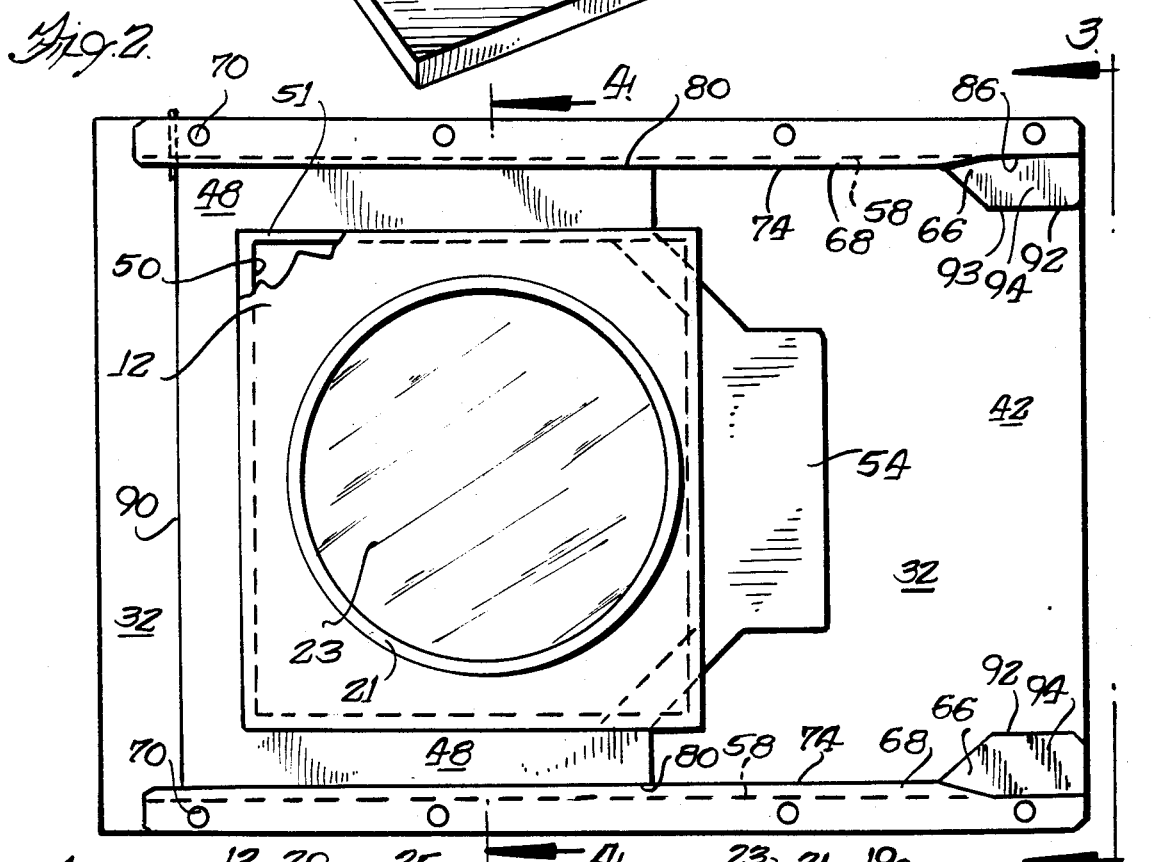
FIG. 2 is a plan view of the photomask-carrying paddle positioned over the top plate of the stage.

FIG. 4 in a cross-sectional view taken along FIG. 4—4 of FIG. 2;

FIG. 5 is an assembly view of the top plate of the stage, the guide rails and the paddle;

FIG. 6 is an enlarged perspective view of the entry section of one of the guide rails;

FIG. 7 is a plan view of the entry section of the opposite guide rail; and

FIG. 8 is an elevation view taken along FIG. 8—8 of FIG. 7.

Figure 1:
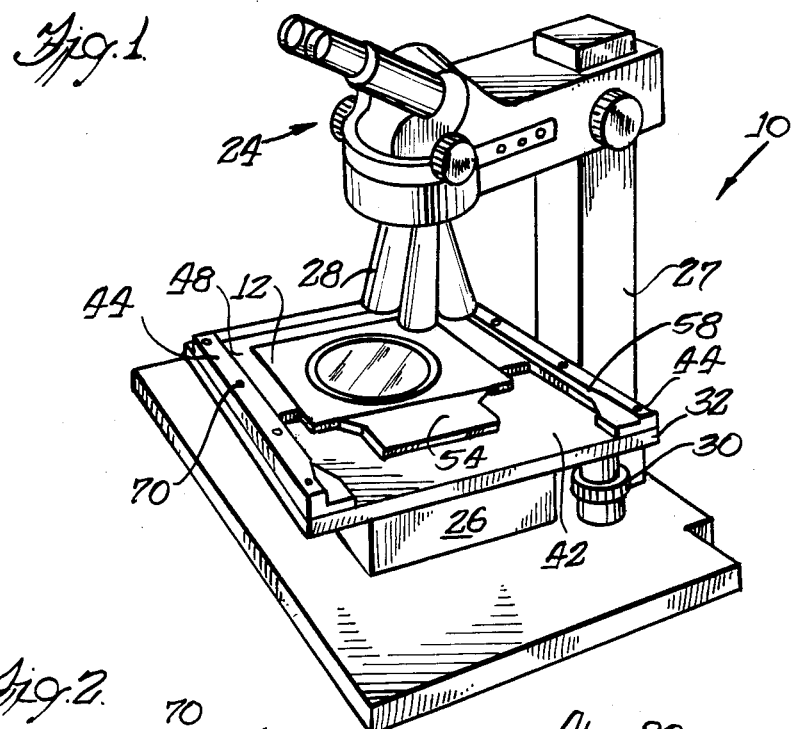
Figure 3:
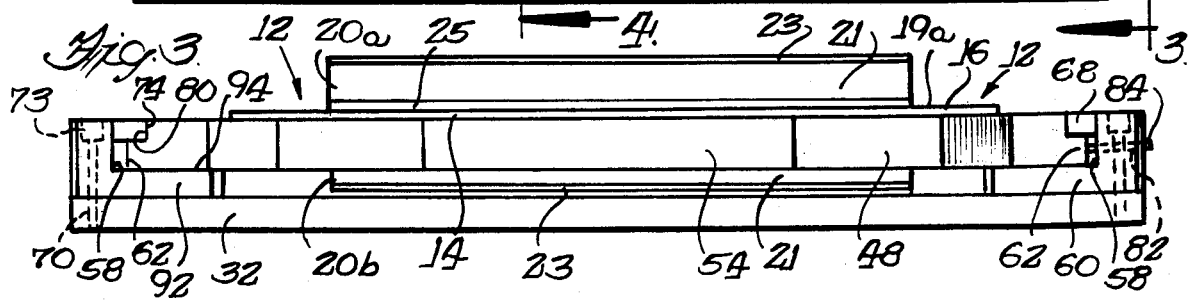
FIG. 3 is an end view taken along FIG. 3—3 of FIG. 2.

Illustrated in FIG. 1 is a perspective view of a work station 10 which is used for examining photomasks 12, each including a glass plate 14 and a thin etched metal coating 16 (FIGS. 3 and 4). The surface 19a of the photomask 12 that is covered with the metal coating 16 is protected with a pellicle 20a and the rear glass surface 19b of the photomask 12 is likewise protected with another pellicle 20b. Each pellicle 20 comprises a metal (e.g., aluminum) frame 21 over which a transparent membrane 23 is stretched. The pellicle 20 is bonded to the photomask with double-sided adhesive tape 25 so that the membrane 23 is spaced between about 3 to 6 mm. above the surface 19. It is particularly desirable that the lower pellicle membrane 23 not be damaged during the inspection.

The work station 10 includes a microscope 24 and a stage 26, disposed below the objective 28 of the microscope, on which the photomask 12 is positioned for inspection. The microscope 24 may be a stereo-microscope or a compound microscope with a long (>6 mm) working distance objective.

The stage 26 moves in both the X and Y axes, i.e., side-to-side and forward and backward, (away from and toward the microscope post 27 with reference to FIG. 1). Stages of this type are commercially available, e.g., from Semprex Corporation. The technician operates the stage with one or more knobs 30.

The stage 26 includes a flat horizontal top plate 32 which is best seen in FIG. 5. The rectangular top plate 32 provides a rectangular window 36 over which the photomask 12 is positioned and through which light is transmitted. Threaded holes 40 extending downward from the upper face 42 of the top plate 32 provide for attachment of parallel guide rails 44 with threaded fasteners 72 to the top plate.

The photomask 12 is positioned on the top plate 32 by means of a photomask paddle 48 that allows the technician to handle the photomask 12 without actually touching the delicate and expensive photomask. The paddle 48 provides a rectangular window 50 with dimensions just smaller than the dimensions of the photomask. Along the window 50 and recessed below the top surface of the paddle is a narrow, inwardly-extending ledge 51 on which the periphery of the photomask 12 seats. The recess above the ledge 51 is closely matched in dimension to the outside edges of the photomask for aligning the photomask relative to the paddle in the X and Y axes. The paddle 48 is typically thinner than the photomask assembly including the adhered pellicles, and one of the pellicles 20b protrudes below the lower face of the paddle several millimeters, requiring that the paddle be positioned somewhat above the upper face 42 of the top plate. At one end, the paddle 48 has a small handle 54 by which the technician manipulates the same. The paddle is typically machined from a unitary piece of metal.

As a means of positioning the paddle 48 vertically above the top plate 32 as well as positioning the paddle in the X and Y axes with respect to the stage 26 so that the photomask locates directly above the top plate window 36, the rails 44 are provided with keyways 58 in which slide surfaces on edge portions 62 of the paddle are slidably received. Each rail 44 is a bar having a lower horizontal flange 66 and an upper horizontal flange 68 defining its rectangular, inwardly facing slot or keyway 58. The rails are preferably formed of a rigid polymeric material.

The tracking edge portions of the paddle 48 are in the form of flanges or keybars 62 that extend outward of the paddle sides and which have a thickness (from top to bottom) just less than the height of the keyways 58. The inner edges 74 of the upper rail flanges 68 include elongated parallel sections 76 that are spaced apart the width of the paddle above the keybar flanges, whereby the inner flange edges, along with the lateral edge surfaces 80 of the paddle above the keybars, serve as bearing surfaces as the keybars 62 slide from side to side within the opposed keyways.

As a means to limit side-to-side sliding of the paddle within the rails and define a fully inserted position of the paddle, a horizontal bore 82 (FIGS. 3 and 4) is provided adjacent to the end of one of the rails opposite its entry end, and a stop, preferably in the form of a pin 84 extends through the bore and into the keyway 58, limiting further sliding of the paddle when the corresponding keybar 62 abuts the pin.

Vertical holes 70 through each rail, outward of its keyway, align with the threaded holes 40 in the top plate 32, providing for attachment theretowith the plurality of bolts 72. The bolt heads 71 are preferably received in countersunk upper portions 73 of the holes 70.

The bottoms of the keybars 62 are coplanar with the bottom of the of the paddle 48, whereby the lower rail flanges 66 define the clearance of the paddle above the upper face 42 of the top plate 32. The clearance provided for pellicle-protected photomasks, as provided by the thickness of the lower rail flanges 66, is somewhat greater than the clearance provided heretofore in rails for unprotected photomasks. It is most important that the underlying pellicle membrane 23 not be damaged during insertion or removal of the paddle and photomask into or from the viewing position under the objective.

In accordance with the present invention, the operator may easily insert a paddle 48 into an inlet means for the guide rails which will prevent the lower pellicle membrane 23 from engaging the top plate 32 or any other surface on the guide rails or stage which could easily damage the membrane. The inlet means and guide rails 44 allow the leading end of the paddle to be dropped downwardly onto a pair of flat horizontal surfaces 94 of platforms 92 (FIG. 2) projecting inwardly of the rails at their inlet ends to space the paddle and the lower pellicle membrane 23 from the top plate 32 and to provide flat horizontal guide surfaces, along which the leading edge of the paddle may be slid to bring the leading ends of the keybars into the inlet ends of the grooves or keyways. Preferably, the inlet means includes at the platforms 92 a pair of vertical walls or sections 86 spaced apart at a distance substantially greater than the width of the paddle between the keybars. To center the paddle and to align the keybars for entry into the keyways, inwardly inclined camming surfaces 96 are provided at the entry end of the upper rail flanges 68 to engage and cam the leading end of the paddle. The inner edges 93 of the platforms 92 are spaced outwardly of the pellicles and photomask so as not to engage the same when either of the sides 80 of the paddle engage a vertical wall or section 86 of the inlet guide means. That is, at the entrance end of the rails 44, sections 86 of the upper flanges 76 are recessed to where their inner edges are spaced apart a greater distance than the width of the paddle, including its keybars 62, permitting the insertion end 90 of the paddle 48 opposite its handle 54 to be lowered vertically into each of the rails with ample clearance on either side for ease of insertion. Also at the entrance ends of the rails 44, the lower flanges 66 broaden inwardly, providing a pair of platforms 92, each with a relatively broad upper surface 94 on which the insertion end 90 of the paddle initially rests before the paddle 48 is slid to the other side.

Because some clearance is provided between the front and back edges of the paddle and the front and back rails at their entrance ends, the front end 90 of the paddle 48 rests upon the platforms 92 with some front-to-rear clearance or play; however, as the paddle is slid laterally to where the bearing edges 80 of the paddle run along the bearing edges 74 of the upper flanges 76, the play is eliminated. To facilitate the transition from the entrance region inward, inclined surface 96 are provided to cam the paddle 48 into the more constricted regions between the rails 44, and herein, where the inner edge section surfaces 74 of the upper flanges 68 serve as bearing surfaces, the inclined camming surface 96 of each rail is provided between the bearing edges 74 and the recessed inner entrance edge wall 86. A gentle angle of the inclined surfaces eases camming, and preferably the camming angle is less than about 30°, typically about 15°.

It is preferred that the entrance ends of the rails 44 extend to the entrance edge of the top plate 32 so that the paddle 48 is assured of contacting the rail platforms 92 without touching the top plate and possibly allowing the photomask to contact a surface, edge or corner thereof. Irrespective of the angle at which the paddle 48 is introduced to the rails 44, the photomask is protected from any damaging contact. As the paddle 48 is slid, the keyways place the paddle in a perfectly horizontal position while aligning the paddle between front and back. Full alignment is achieved when the paddle abuts the stop pin 84. At all times as the paddle is slid, the pellicle-protected photomask is held above the upper face 42 of the top plate 32.

While the invention has been described in terms of a particular preferred embodiment, modifications obvious to one with ordinary skill in the art may be made without departing from the scope of the invention. For example, the vertical ends of the keyways could serve as the bearing surfaces for the edges of the keybars, in which case, the vertical keyway edges would be expanded at the entrance ends, and a connecting segments between these surfaces would be inclined for camming the paddle.

Various features of the invention are set forth in the following claims.

What is claimed is:

1. In combination
    a micorscopic examination stage having a flat top plate,
    paddle means for carrying a generally flat object in horizontal and vertical alignment, edge portions of said paddle means having parallel keybars,
    a pair of guide rail means along opposite sides of said top plate, each having an inwardly extending upper flange defining an elongated keyway therebelow for slidably receiving one of said keybars, said guide rails having an entrance region,
    said upper flanges having parallel sections and, at said entrance region, being recessed outward relative to said parallel sections to a distance greater than the width of said paddle means, whereby one end of said paddle means may be lowered into said entrance region.

2. A combination in accordance with claim 1, said guide rail means having inclined surfaces for camming said edge portions of said paddle from said entrance portion into said keyways.

3. A combination in accordance with claim 2, said inclined surfaces being provided on a section of said upper flanges adjacent to said entrance region.

4. A combination in accordance with claim 1, said rails having lower inwardly extending flanges defining lower sides of said keyways, said lower flanges spacing said paddle means vertically from said top plate.

5. A combination in accordance with claim 4, said lower flanges each having a broad inwardly-extending platform at said entrance region.

6. A combination in accordance with claim 1, said guide rail means at said entrance region extending substantially to an end of said top plate.

7. In a microscopic stage for handling a photomask covered with a pellicle, the combination comprising:
    a flat top plate on the stage of which a viewing portion is positionable under the objective of a microscope,
    a carrier paddle having the photomask covered by the pellicle and having slide surfaces on opposite sides thereof, said carrier paddle having an aperture therein at which the photomask is viewed, said carrier paddle adapted to carry a pellicle projecting vertically upwardly and downwardly from said paddle,
    guide rails mounted on the stage at horizontally spaced locations for supporting the paddle at a predetermined position on the stage,
    horizontally extending guide surfaces on the guide rails located at a predetermined height above the said top flat plate to engage and supported said slide surfaces on said paddle with the pellicle projecting downwardly between the guide rails and below the plane define by the horizontally extending guide surfaces and spaced above said flat top plate,
    means on said guide rails and said paddle guiding the paddle for rectilinear travel along the guide rails and for holding the paddle against vertical or rotational displacement,
    inlet means associated with the guide rails for engaging the leading end of the carrier paddle to prevent the pellicle from hitting the top plate as it is being positioned for insertion between the guide rails and for centering the carrier paddle between the guide rails, said inlet means comprising a pair of flat planar horizontal surfaces projecting inwardly from the guide rails and sapced apart at a distance greater than the photomask so as to engage the edges of said paddle outboard of the photomask, the pellicle projecting downwardly between said horizontal surfaces to a position lower than said horizontal surfaces, said horizontal surfaces being spaced upwardly from said top plate at a predetermined distance to hold and space the photomask from the contact with said top plate, said horizontal surfaces being vertically unobstructed from above so as to allow a leading end of said photomask carrier paddle to be lowered thereonto and to locate the pellicle above the top flat plate prior to reclinear movement of the paddle along said guide rails, said inlet means being sufficiently broad relative to the width of said paddle to provide ample clearance along the edges of said paddle for ease of insertion of its leading end.

8. The combination in accordance with claim 1, in which the inlet means also includes a pair of inwardly inclined surfaces on said guide rails for camming engagement with the edges of said carrier paddle at its leading end to center edges of said paddle between said opposed guiding surfaces as said paddle is being slid along the horizontal surfaces.

9. The combination in accordance with claim 1 in which the guide rails have longitudinally extending grooves therein and in which the slide surfaces on the carrier paddle are longitudinally extending parallel flanges projecting into the grooves and having sliding contact therewith.

10. In a microscopic stage for handling a photomask covered with a pellicle, the combination comprising:

a flat top plate on the stage of which a viewing portion is positionable under the objective of a microscope, a carrier paddle having the photomask covered by the pellicle and having longitudinally extending flanges providing slide surfaces on opposite sides thereof, said carrier paddle having an aperture therein at which the photomask is viewed, a pair of guide rails mounted on the stage each having a longitudinally extending groove providing opposed guiding surfaces spaced apart a predetermined distance to engage said longitudinal flanges and to guide the slide surfaces on the carrier paddle for rectilinear travel over said viewing portion, said guide rails vertically spacing the pellicle from the top plate during the rectilinear travel of the photomask, the inter-engagement of said flanges and said grooves preventing vertical displacement of said paddle when fully slid into position relative to said guide rails, and inlet means associated with the guide rails for engaging the leading end of the carrier paddle to prevent the pellicle from hitting the top plate as it is being positioned for insertion between the guide rails and for centering the carrier paddle between the guide rails, said inlet means comprising a pair of flat, planar, horizontal surfaces projecting inwardly from the guide rails and spaced apart at a distance greater than the photomask so as to engage the edges of said paddle outboard of the photomask, said horizontal surfaces being spaced upwardly from said top plate at a predetermined distance to hold and space the photomask from contact with said top plate, said horizontal surfaces being vertically unobstructed from above so as to allow the leading end of said paddle to be lowered thereonto, said inlet means having vertical surfaces sufficiently widely apart relative to the width of said paddle to provide ample clearance along the edges of said paddle for ease of insertion of its leading end and, immediately inward of said widely spaced apart vertical surfaces, a pair of inwardly inclined vertical surfaces for camming engagement with the edges of said carrier paddle at its leading end to center edges of said paddle between said opposed guiding surfaces as said paddle is being slid along the said horizontal surfaces.

* * * * *

UNITED STATES PATENT AND TRADEMARK OFFICE
CERTIFICATE OF CORRECTION

PATENT NO. : 4,641,930

DATED : February 10, 1987

INVENTOR(S) : T. Charles Podvin and Gene A. Porter

It is certified that error appears in the above-identified patent and that said Letters Patent is hereby corrected as shown below:

Col. 4, Line 22, after "of the" delete "of the".
Col. 4, Line 49, change "distanoe" to --distance--.
Col. 5, Line 42, delete "a".
Col. 6, Line 30, after "above" delete "the".
Col. 6, Line 34, delete "define" and substitute --defined--.
Col. 6, Line 48, change "sapced" to --spaced--.
Col. 6, Line 61, delete "reclinear" and substitute --rectilinear--.
Col. 8, Line 19, after "surfaces" insert --spaced--.

Signed and Sealed this

Twenty-fifth Day of August, 1987

*Attest:*

DONALD J. QUIGG

*Attesting Officer*　　　　*Commissioner of Patents and Trademarks*